(12) United States Patent
Maeda (10) Patent No.: US 9,429,056 B2
(45) Date of Patent: Aug. 30, 2016

(54) NOX REDUCING DEVICE

(71) Applicant: KOBELCO CONSTRUCTION MACHINERY CO., LTD., Hiroshima-shi (JP)

(72) Inventor: Takayuki Maeda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/557,555

(22) Filed: Dec. 2, 2014

(65) Prior Publication Data

US 2015/0184568 A1    Jul. 2, 2015

(30) Foreign Application Priority Data

Dec. 27, 2013 (JP) ................................ 2013-272367

(51) Int. Cl.
| | |
|---|---|
| *F01N 13/14* | (2010.01) |
| *F01N 3/08* | (2006.01) |
| *B60K 13/04* | (2006.01) |
| *F01N 3/20* | (2006.01) |
| *F01N 13/18* | (2010.01) |

(Continued)

(52) U.S. Cl.
CPC ............. *F01N 3/0814* (2013.01); *B60K 13/04* (2013.01); *F01N 3/021* (2013.01); *F01N 3/20* (2013.01); *F01N 3/2066* (2013.01); *F01N 13/1822* (2013.01); *B60Y 2200/41* (2013.01); *E02F 9/0866* (2013.01); *F01N 2590/08* (2013.01); *F01N 2610/02* (2013.01); *Y02T 10/24* (2013.01)

(58) Field of Classification Search
CPC ........... F01N 13/1822; F01N 2340/04; B60K 13/04; E02F 9/0866
See application file for complete search history.

(56) References Cited

U.S. PATENT DOCUMENTS

| | | | |
|---|---|---|---|
| 2010/0031644 A1 | 2/2010 | Keane et al. | |
| 2010/0186381 A1* | 7/2010 | Charles ................... | F01N 3/025 60/282 |

(Continued)

FOREIGN PATENT DOCUMENTS

| | | |
|---|---|---|
| EP | 2 801 711 A1 | 11/2014 |
| JP | 2007-292490 | 11/2007 |

(Continued)

OTHER PUBLICATIONS

Extended European Search Report issued Apr. 30, 2015 in Patent Application No. 14196787.7.

(Continued)

*Primary Examiner* — Jonathan Matthias
(74) *Attorney, Agent, or Firm* — Oblon, McClelland, Maier & Neustadt, L.L.P.

(57) ABSTRACT

Provided is a NOx reducing device which is capable of effectively protecting a NOx controller against heat and water, while suppressing an increase in cost of a construction machine and deterioration in assemblability of the NOx controller. The NOx reducing device comprises a device body, a tail pipe provided at an outlet end portion of the device body, a NOx controller, and a mount table supporting the device body. The mount table comprises a top plate and a leg supporting the top plate. The device body and the tail pipe are provided on an upper side of the top plate. The NOx controller is provided with respect to a lower surface of the top plate in such a manner that the NOx controller is entirely covered from thereabove by the top plate.

5 Claims, 4 Drawing Sheets

(51) Int. Cl.
*F01N 3/021* (2006.01)
*E02F 9/08* (2006.01)

(56) References Cited

U.S. PATENT DOCUMENTS

2010/0294578 A1* 11/2010 Shimomura ............. B60K 1/04
                                                            180/65.21
2011/0000199 A1*  1/2011 Ezawa ............... B01D 46/0002
                                                              60/311
2013/0145820 A1*  6/2013 Boahene ............... F01N 13/008
                                                             73/23.31
2014/0348716 A1   11/2014 Park

FOREIGN PATENT DOCUMENTS

JP       2009-68419      4/2009
JP       2010-270555    12/2010
JP       2013-224542    10/2013

OTHER PUBLICATIONS

English Summary of Office Action dated Oct. 20, 2015 in Japanese Patent Application No. 2013-272367, previously filed on Nov. 18, 2015.
Office Action issued Oct. 20, 2015 in Japanese Patent application No. 2013-272367.

* cited by examiner

FIG. 6

NOX REDUCING DEVICE

TECHNICAL FIELD

The present invention relates to a NOx reducing device provided for a construction machine having an engine to serve as an aftertreatment device for an exhaust gas of the engine.

BACKGROUND ART

The background art of the present invention will be described by taking a shovel as an example. The shovel comprises a lower traveling body, and an upper slewing body mounted on the lower traveling body.

Figure 5:
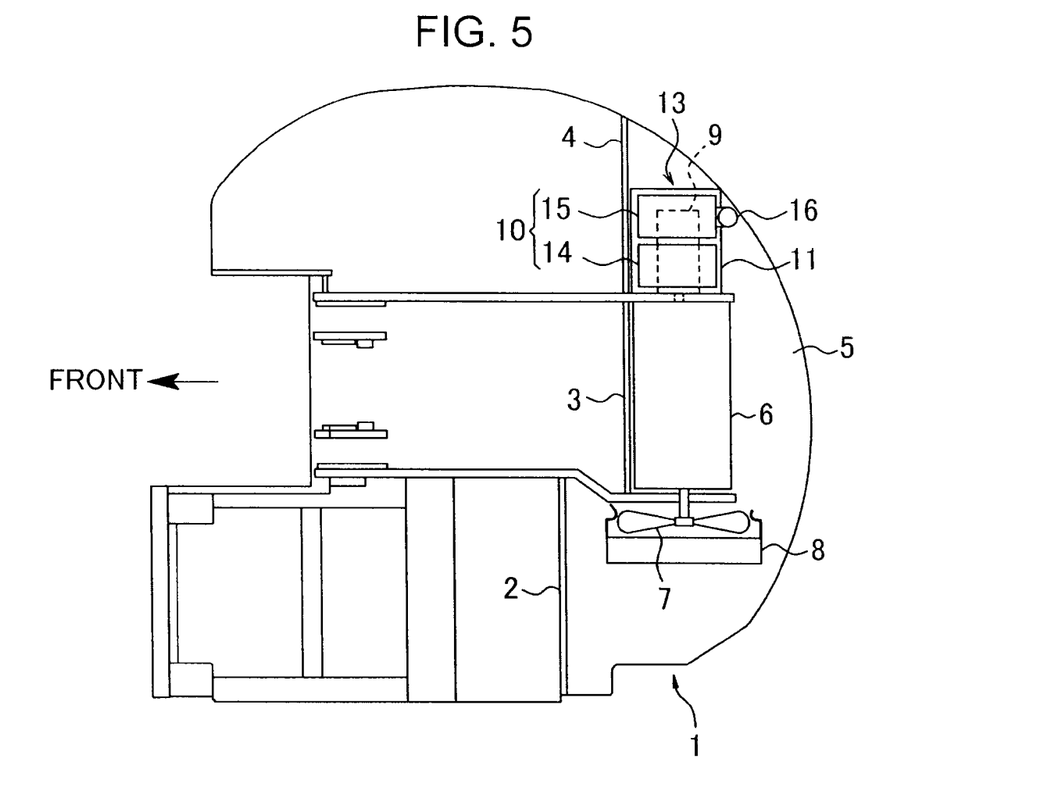
FIG. 5 is a schematic top plan view of an upper slewing body of a conventional hydraulic shovel.
Figure 6:
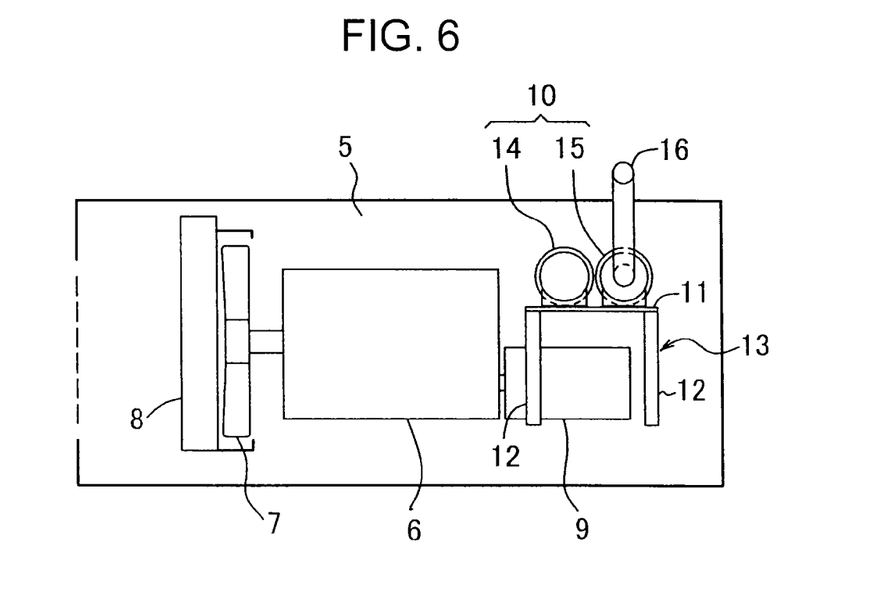
FIG. 6 is a back view of an engine compartment provided on a rear region of the upper slewing body illustrated in FIG. 5.

FIG. 5 is a top plan view of the upper slewing body, and FIG. 6 is a back view of a rear end of the upper slewing body.

The upper slewing body comprises an upper frame 1 as a base thereof, and a non-illustrated working attachment attached to one end portion (in FIG. 5, left end portion) of the upper frame 1 (The following description will be made on an assumption that this end a "front" end). The working attachment includes a boom, an arm and a bucket.

The upper slewing body further comprises: three partition walls 2 to 4 each extending in a right-left direction; an engine 6; a combination of a cooling fan 7 and a heat exchanger 8 as cooling equipment; a hydraulic pump 9; and an exhaust gas aftertreatment device 10.

The partition walls 2 to 4 define an engine compartment 5 on a rear region of the upper frame 1. Within the engine compartment 5, the engine 6 is provided, and the cooling fan 7 and the heat exchanger 8 such as a radiator are installed on a left side of the engine 6.

The hydraulic pump 9 is provided on a right side of the engine 6 while being connected to an output shaft of the engine, and the exhaust gas aftertreatment device (additionally serving as a muffler) 10 is installed on the right side of the engine 6 in a posture where it extends transversely across an upper side of the hydraulic pump 9.

The exhaust gas aftertreatment device 10 comprises: an exhaust gas purifying device 14 comprised of a DPF (Diesel Particulate Filter) for removing PM (Particulate Matter) such as soot contained in exhaust gas and provided in an engine exhaust passage; and a NOx reducing device 15 comprised of an SCR (Selective Catalytic Reduction) system for decreasing NOx emissions and provided in the engine exhaust passage at a position downstream of the exhaust gas purifying device 14, as disclosed, for example, in JP 2013-224542 A.

The NOx reducing device 15 comprises a device body (reference sign is omitted) for performing a urea-based selective catalytic reduction (SCR) reaction for NOx, and a tail pipe (exhaust stack) 16 for releasing treated exhaust gas from the device body to the outside. In some cases, the device body of the NOx reducing device 15 is disposed in side-by-side relation to the exhaust gas purifying device 14 in the right-left direction.

The NOx reducing device 15 further comprises a mount table 13. As illustrated in FIGS. 5 and 6, the mount table 13 has a top pate 11, and a plurality of support legs 12 and the mount table 13 is arranged to stride over the hydraulic pump 9 so as to support the exhaust gas purifying device 14 and the device body of the NOx reducing device 15. The exhaust gas purifying device 14 and the device body of the NOx reducing device 15 are installed on the top plate 11 of the mount table 13 (also, see JP 2013-224542 A).

The NOx reducing device 15 further comprises: a NOx sensor configured to detect an amount of NOx contained in exhaust gas; a urea solution injection control section (Dosing Control Unit: DCU) configured to control an injection amount of urea solution; and a NOx controller configured to send, as NOx information, a signal from the NOx sensor to the urea solution injection control section (none of these components is illustrated).

With a view to shortening a length of a harness to be connected to the NOx sensor, to thereby decrease noise and costs, the NOx controller is installed at a position around the NOx reducing device 15 and close to the NOx sensor.

However, the NOx reducing device 15, particularly, the tail pipe 16, is heated up to extremely high temperatures during engine operation, thereby causing a problem that the NOx controller undergoes heat damage including shortening of usable life, failure, malfunction, and the like caused by the high temperatures.

Moreover, the NOx controller is less resistant to water, and is likely to be adversely influenced by rainwater or washing water intruding into the engine compartment 5.

As a countermeasure against the above problems, it is conceivable to surround the NOx controller by a heat insulating material or a cover with a heat insulating material. However, this countermeasure is inadvisable because it leads to an increase in cost of a construction machine and deterioration in assembleability (installability) of the NOx controller.

It is also conceivable to install the NOx controller at a position away from the tail pipe 16 radiating heat at a level of the highest temperature, as far as possible. However, this countermeasure is less effective, because flexibility in positional selectivity of the NOx controller becomes low due to restrictions on harness length and limitations on space, and a remaining portion of the NOx reducing device 15 other than the tail pipe is also deemed as a high-temperature portion through which exhaust gas flows.

SUMMARY OF INVENTION

It is an object of the present invention to provide a NOx reducing device capable of effectively protecting a NOx controller against heat and water, while suppressing an increase in cost of a construction machine and deterioration in assemblability of the NOx controller.

In order to achieve the above object, the present invention provides a NOx reducing device which is provided for a construction machine having an engine to serve as an exhaust gas aftertreatment device for treating exhaust gas from the engine to decrease NOx in the exhaust gas by using an aqueous urea solution. The NOx reducing device comprises: a device body configured to allow execution of a urea-based selective catalytic reduction reaction for the NOx, wherein the device body has an outlet end portion; a tail pipe provided at the outlet end portion; an aqueous urea solution injection control section configured to control an injection amount of an aqueous urea solution; a NOx sensor configured to detect an amount of NOx in the exhaust gas; a NOx controller configured to send, as NOx information, a signal from the NOx sensor, to the aqueous urea solution injection control section; and a mount table supporting the device body, wherein the mount table comprises a top plate and a leg supporting the top plate. In the NOx reducing device, the device body and the tail pipe are provided on an upper side of the top plate, and the NOx controller is provided with respect to a lower surface of the top plate in such a manner that the NOx controller is entirely covered from thereabove by the top plate.

The present invention can effectively protect the NOx controller against heat and water, while suppressing an increase in cost of a construction machine and deterioration in assemblability of the NOx controller.

DESCRIPTION OF EMBODIMENTS

With reference to the accompanying drawing, the present invention will now be described based on embodiments thereof It is to be understood that the following description is made to exemplify some embodiments of the present invention and is not intended to limit the scope of the present invention.

With reference to FIGS. 1 to 4, one embodiment of the present invention will be described.

This embodiment is one example where the present invention is applied to a shovel in which an exhaust gas aftertreatment device 20 is installed on a rear region of an upper slewing body, in the same manner as that in the conventional shovel illustrated in FIGS. 5 and 6.

Specifically, the shovel comprises a lower traveling body, and an upper slewing body mounted on the lower traveling body.

The upper slewing body comprises an upper frame 1 as a base thereof, and a non-illustrated working attachment attached to one end portion (in FIG. 5, left end portion) of the upper frame 1 (The following description will be made on an assumption that this end portion is a "front" end portion). The working attachment includes a boom, an arm and a bucket.

Figure 1:
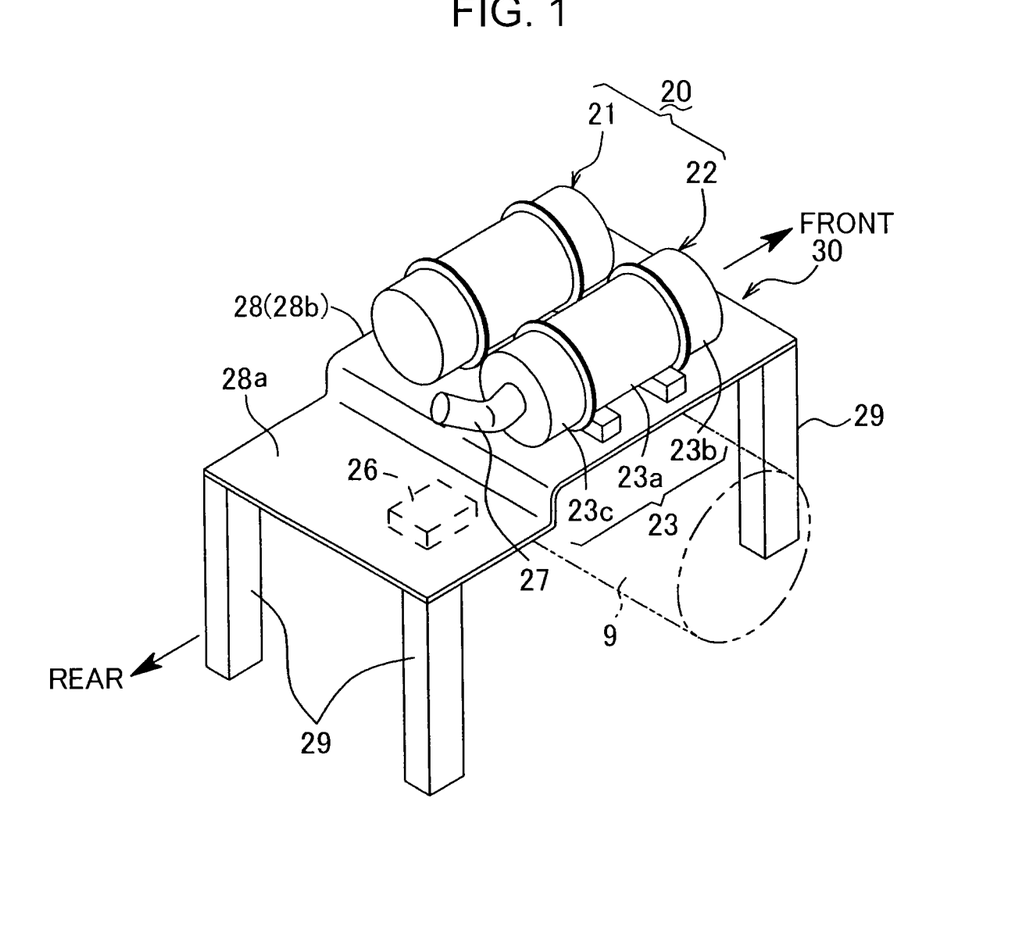
FIG. 1 is a perspective view illustrating an installed state of an exhaust gas aftertreatment device according to one embodiment of the present invention.
Figure 2:
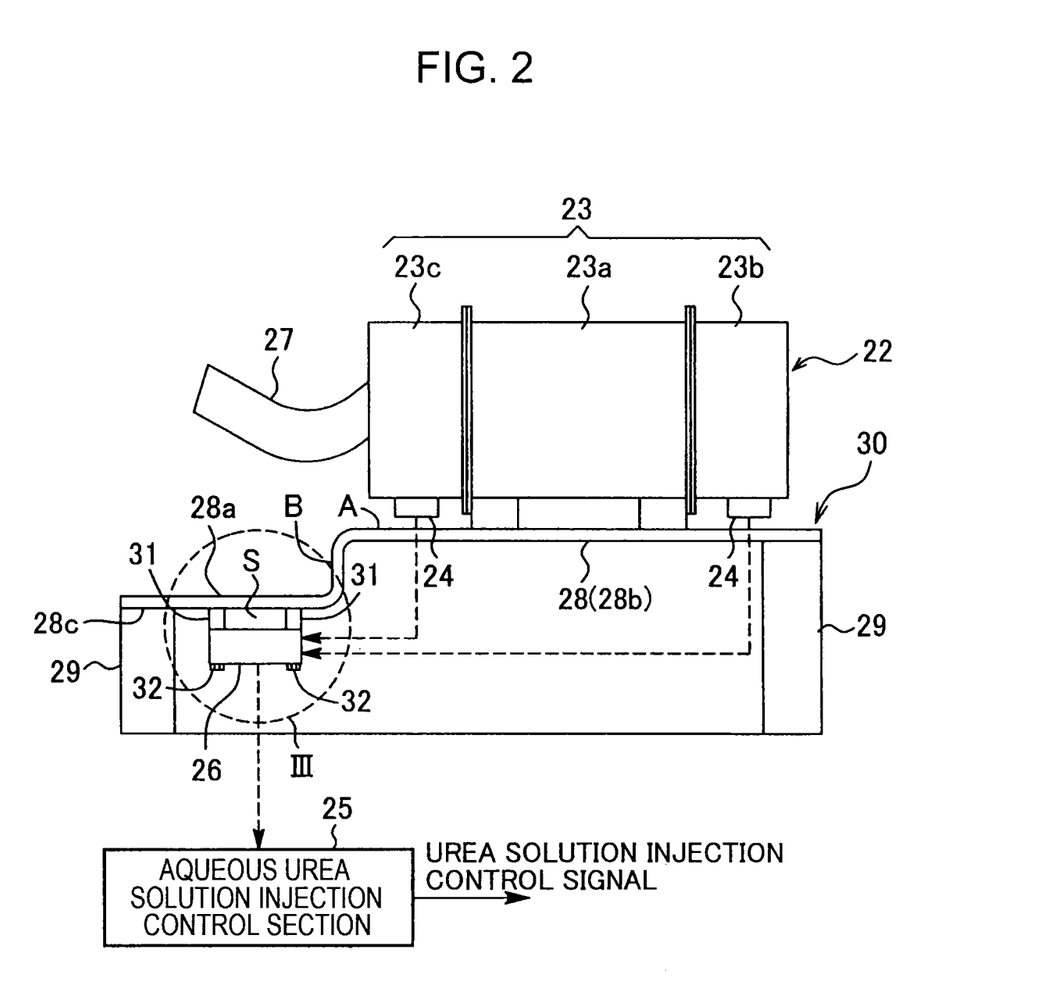
FIG. 2 is a side view illustrating the installed state.

The upper slewing body further comprises: partition walls 2 to 4 each extending in a right-left direction; an engine 6; a combination of a cooling fan 7 and a heat exchanger 8 as cooling equipment; a hydraulic pump 9; and an exhaust gas aftertreatment device 20 (see FIG. 1).

The partition walls 2 to 4 define an engine compartment 5 on a rear region of the upper frame 1. Within the engine compartment 5, the engine 6 is provided, and the cooling fan 7 and the heat exchanger 8 such as a radiator are installed on a left side of the engine 6.

The hydraulic pump 9 is provided on a right side of the engine 6 while being connected to an output shaft of the engine 6, and the exhaust gas aftertreatment device 20 (an aftermentioned exhaust gas purifying device 21 and a device body 23 of an aftermentioned NOx reducing device 22) is installed on the right side of the engine 6 in a posture where the exhaust gas aftertreatment device 20 extends transversely across an upper side of the hydraulic pump 9.

Figure 3:
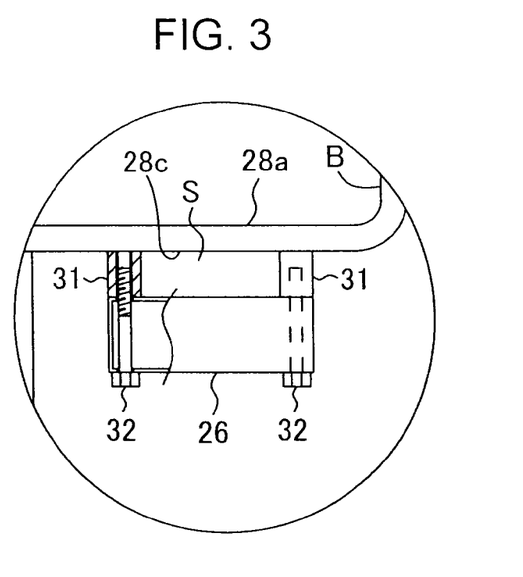
FIG. 3 is a side view enlargedly illustrating the area III encircled by the broken line in FIG. 2.

Referring to FIGS. 1 and 3, the exhaust gas aftertreatment device 20 comprises: an exhaust gas purifying device 21 comprised of a DPF (Diesel Particulate Filter) for removing PM (Particulate Matter) such as soot contained in exhaust gas and provided in an engine exhaust passage; and a NOx reducing device 22 comprised of an SCR (Selective Catalytic Reduction) system for decreasing NOx emissions and provided in the engine exhaust passage at a position downstream of the exhaust gas purifying device 21. The exhaust gas purifying device 21 and the aftermentioned device body 23 of the NOx reducing device 22 are arranged in side-by-side relation in the right-left direction.

The NOx reducing device 22 comprises: a device body 23 configured to allow execution of a urea-based SCR reaction for NOx, wherein the device body 23 has an exhaust gas outlet end portion (aftermentioned outlet end cover 23c); a tail pipe 27 provided at the outlet end portion of the device body 23 to release treated exhaust gas from the device body 23 to the outside; a NOx sensor 24 configured to detect an amount of NOx in exhaust gas; an aqueous urea solution injection control section (Dosing Control Unit: DCU) 25 configured to control an injection amount of an aqueous urea solution; a NOx controller 26 configured to send, as NOx information, a signal from the NOx sensor 24, to the aqueous urea solution injection control section 25; and a mount table 30 supporting the device body 23. Depending on an amount of NOx contained in exhaust gas, an amount of the aqueous urea solution to be injected into an inside of the device body 23 is controlled by the NOx reducing device 22.

The device body 23 comprises: a casing 23a internally equipped with a urea-based SCR catalyst and an oxidation catalyst; and an inlet end cover 23b and an outlet end cover 23c provided on respective opposite sides of the casing 23a.

The tail pipe 27 is provided in a central region of an edge face of the outlet end cover 23c. In this embodiment, the tail pipe 27 is formed in a V shape which has a first portion gradually extending obliquely downwardly from the outlet end cover 23c in a lateral (rearward) direction, and a second portion gradually extending obliquely upwardly from a distal end of the first portion in the lateral (rearward) direction. That is, the entire tail pipe 27 is disposed close to an aftermentioned top plate 28 of the mount table 30, and, particularly, an intermediate region of the tail pipe 27 is disposed closest to the aftermentioned top plate 28.

The mount table 30 supports the exhaust gas purifying device 21 and the device body 23. Specifically, the mount table 30 comprises a top plate 28, and a plurality of (in this embodiment, total four) legs 29 supporting the top plate 28. The mount table 30 are arranged to stride over the hydraulic pump 9. The exhaust gas purifying device 21 and the device body 23 of the NOx reducing device 22 are installed on the top plate 28 in side-by-side relation. That is, the device body 23 and the tail pipe 27 are provided on an upper side of the top plate 28.

Each of the top plate 28 and the legs 29 may be made of a commonly-used metal material such as steel sheet. In particular, the top plate 28 may be made of a raw material having at least one of heat resisting properties and heat shielding properties.

The top plate 28 has a device-body support portion 28b with a reference surface (upper surface) A supporting the device body 23, and a NOx-controller installation portion 28a with a lower surface 28c provided with the NOx controller 26. In this embodiment, the reference surface A supports the exhaust gas purifying device 21 and the device body 23 of the NOx reducing device 22.

The NOx-controller installation portion 28a is coupled to a side edge (rear edge) of the device-body support portion 28b through a step portion B, so as to allow an upper surface of the NOx-controller installation portion 28a to be located below the upper surface (reference surface A) of the device-body support portion 28b, and allow the lower surface 28c of the NOx-controller installation portion 28a to be located below a lower surface of the device-body support portion 28b.

In this embodiment, the device body 23 is supported by the device-body support portion 28b, in a posture where the tail pipe 27 extends laterally (approximately horizontally: backwardly in this embodiment) from the device body 23. Further, the top plate 28 has an outlet-side end region (rear end region) provided at a position offset from the device body 23 on a tail pipe side of the device body 23 where the tail pipe is provided (offset rearwardly from the device body 23), and the NOx-controller installation portion 28a is provided with respect to the outlet-side end region of the top plate 28.

The NOx controller 26 is attached to the lower surface 28c of the top plate 28 in such a manner that the NOx controller 26 is entirely covered from thereabove by the top plate 28 (NOx-controller installation portion 28a), and an air layer S is formed between the NOx controller 26 and the lower surface 28c of the top plate 28.

Specifically, the NOx controller 26 is attached in the above state by providing a pair of elongated nuts 31, 31 on the lower surface 28c of the NOx-controller installation portion 28a to protrude downwardly, and, after penetratingly inserting two bolts 32, 32 into the NOx controller 26 from therebelow, screwing the bolts 32, 32 into the elongated nuts 31, 31, respectively.

As above, the NOx controller 26 is provided with respect to the lower surface 28c of the top plate 28 (NOx-controller installation portion 28a) in such a manner that the NOx controller 26 is entirely covered from thereabove by the NOx-controller installation portion 28a. Therefore, it becomes possible to protect the NOx controller 26 against heat and water by utilizing the NOx-controller installation portion 28a as a heat shielding plate and a water-protection roof The utilization of the top plate 28 of the mount table 30 as a protective member also makes it possible to eliminate a need for an extra heat insulating material or cover, and allow the NOx controller 26 and the device body 23 to be preliminarily installed to the top plate 28 and then assembled to an installation site in the form of an integrated unit (so-called "sub-assembling"). This is advantageous in terms of cost of the shovel and assemblability (installability) of the NOx controller 26.

That is, it becomes possible to effectively protect the NOx controller 26 against heat and water, without causing negative effects such as an increase in cost of the shovel and deterioration in assemblability of the NOx controller 26.

Further, the NOx-controller installation portion 28a is coupled to the side edge of the device-body support portion 28b through the step portion B, so as to allow the upper surface of the NOx-controller installation portion 28a to be located below the upper surface of the device-body support portion 28b, and allow the lower surface 28c of the NOx-controller installation portion 28a to be located below the lower surface of the device-body support portion 28b. Therefore, the NOx controller 26 can be disposed away from a heat source (device body 23 and tail pipe 27). This allows the heat protection effect (protective effect against heat) to be further enhanced.

This effect becomes particularly effective in the situation where the tail pipe 27 as a heat source is formed in a V shape, and the tail pipe 27 is disposed to extend from the central region of the outlet end face of the device body 23 to come close to the top plate 28, as in this embodiment.

Further, the NOx-controller installation portion 28a is provided in a region offset laterally (backwardly) from the device body 23 and having a low possibility of the existence of a structure hindering installation of the NOx controller 26, so that the installation of the NOx controller 26 becomes easier.

In other words, because the NOx-controller installation portion 28a allows the NOx controller 26 to be reliably protected against heat damage, it becomes possible to install the NOx controller 26 at a position where it can be easily installed without any concern for heat from the tail pipe 27.

Furthermore, the NOx controller 26 is provided in such a manner that the air layer S is formed between the NOx controller 26 and the lower surface 28c of the top plate 28, so that, based on a heat insulating effect of the air layer S, the heat protection effect can be further enhanced.

<Other Embodiments>

Figure 4:
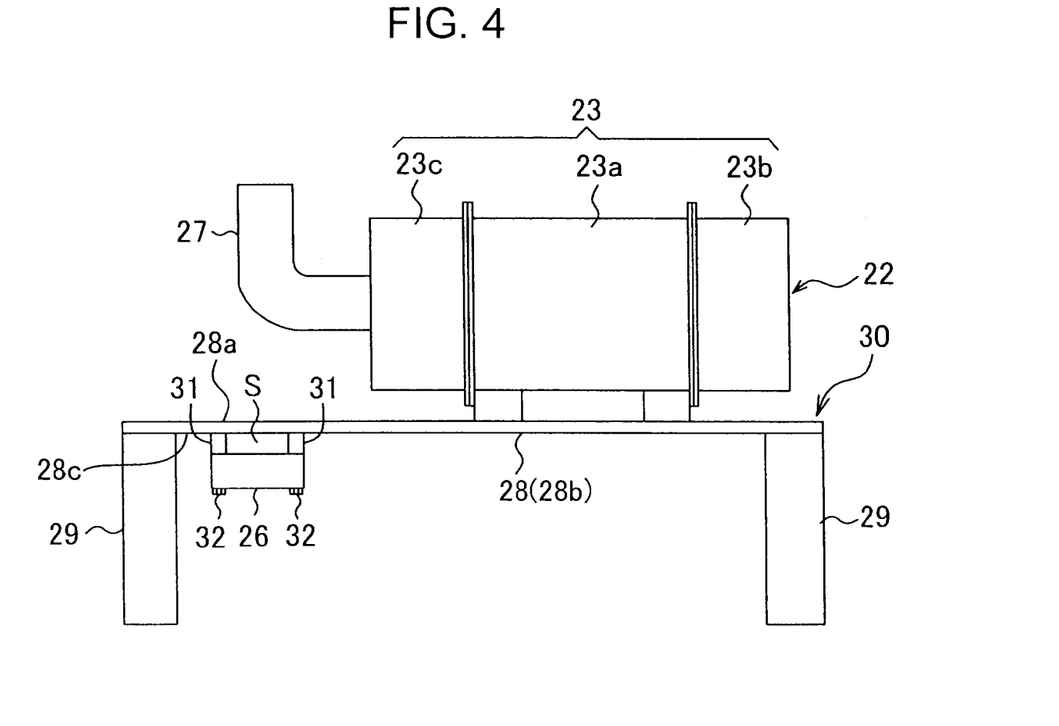
FIG. 4 is a side view illustrating an installed state of an exhaust gas aftertreatment device according to another embodiment of the present invention.

(1) As illustrated in FIG. 4, the NOx-controller installation portion 28a of the top plate 28 of the mount table 30 may be coupled to a remaining portion of the top plate 28 without interposing the step portion therebetween, i.e., coupled in such a manner as to become flush with the remaining portion, and the NOx controller 26 may be installed with respect to the lower surface of the NOx-controller installation portion 28a.

This makes it possible to eliminate a need to perform a working for forming the step portion in the top plate 28, so that it becomes possible to keep a production cost at a low level.

Even in this case, as a fundamental effect, it is possible to protect the NOx controller 26 against heat and water, based on heat shielding and water protection actions of the top plate 28 (NOx-controller installation portion 28a).

Particularly, this configuration is preferable in the case where the tail pipe 27 is formed in an L shape which has a first portion extending laterally (approximately horizontally) from the outlet end cover 23c, and a second portion extending upwardly from a distal end of the first portion, as illustrated in FIG. 4 (i.e., in the case where a distance between the tail pipe 27 and the NOx controller 26 is greater than that in the aforementioned embodiment).

(2) The NOx controller 26 may be installed with respect to a lower surface of a portion of the top plate 28 on which the device body 23 is installed (e.g., the device-body support portion 28b).

(3) As an installation structure of the NOx controller 26 with respect to the lower surface of the top plate 28, any suitable structure other than that in the above embodiment may be employed. For example, it is possible to employ a structure in which an elongated nut is provided on an upper surface of the NOx controller 26 to protrude upwardly, and the NOx controller 26 is installed with respect to the top plate 28 by using a bolt penetratingly inserted into the top plate 28 from thereabove.

The NOx controller 26 may be directly installed to the lower surface of the top plate 28 (without forming the air layer 5 therebetween).

(4) In the aforementioned embodiment, only one NOx controller 26 is installed with respect to the lower surface of the top plate 28. In the case where a plurality of NOx controllers are provided, all of the NOx controllers may be installed with respect to the lower surface of the top plate 28.

(5) In addition to a shovel, the present invention can be widely applied to a construction machine provided with a NOx reducing device with a NOx controller.

The above specific embodiments primarily include an invention having the following features.

In order to achieve the aforementioned object, the present invention provides a NOx reducing device which is provided for a construction machine having an engine to serve as an exhaust gas aftertreatment device for treating exhaust gas from the engine to decrease NOx in the exhaust gas by using an aqueous urea solution. The NOx reducing device comprises: a device body configured to allow execution of a urea-based selective catalytic reduction (SCR) reaction for the NOx, wherein the device body has an outlet end portion; a tail pipe provided at the outlet end portion; an aqueous urea solution injection control section configured to control an injection amount of an aqueous urea solution; a NOx sensor configured to detect an amount of NOx in the exhaust gas; a NOx controller configured to send, as NOx information, a signal from the NOx sensor, to the aqueous urea solution injection control section; and a mount table supporting the device body, wherein the mount table comprises a top plate and a leg supporting the top plate. In the NOx reducing device, the device body and the tail pipe are provided on an upper side of the top plate, and the NOx controller is provided with respect to a lower surface of the top plate in such a manner that the NOx controller is entirely covered from thereabove by the top plate.

In the present invention, the NOx controller is installed with respect to the lower surface of the top plate of the mount table in such a manner that the NOx controller is entirely covered from thereabove by the top plate, so that it becomes possible to effectively protect the NOx controller against heat and water by utilizing the top plate as a heat shielding plate and a water-protection roof.

The utilization of the top plate of the mount table as a protective member also makes it possible to eliminate a need for an extra heat insulating material or cover, and allow the NOx controller and the device body to be preliminarily installed to the top plate and then assembled to an installation site in the form of an integrated unit (so-called "subassembling"). This is advantageous in terms of cost of the construction machine and assemblability (installability) of the NOx controller.

Preferably, in the NOx reducing device, the top plate has a device-body support portion with an upper surface supporting the device body, and a NOx-controller installation portion with a lower surface provided with the NOx controller, wherein the NOx-controller installation portion is coupled to a side edge of the device-body support portion through a step portion, so as to allow an upper surface of the NOx-controller installation portion to be located below the upper surface of the device-body support portion, and allow the lower surface of the NOx-controller installation portion to be located below a lower surface of the device-body support portion.

According to this aspect, the NOx controller can be disposed away from a heat source (device body and tail pipe). This allows the heat protection effect to be further enhanced.

Preferably, in the above NOx reducing device, the device body is supported by the device-body support portion, in a posture where the tail pipe extends laterally from the device body, wherein the top plate has an end region provided at a position offset from the device body on a tail pipe side of the device body where the tail pipe is provided, and the NOx-controller installation portion is provided with respect to the end region of the top plate. This aspect becomes particularly effective in a situation where the tail pipe is disposed in adjacent relation to the top plate, because NOx-controller can be disposed below the tail pipe and at a position away from the tail pipe.

Further, according to this aspect, the NOx controller is provided with respect to the end region of the top plate offset from the device body on a tail pipe side of the device body where the tail pipe is provided, i.e., at a position having a low possibility of the existence of an obstacle to installation of the NOx controller, so that the installation of the NOx controller becomes easier.

In other words, because the NOx-controller installation portion allows the NOx controller to be reliably protected against heat damage, it becomes possible to install the NOx controller at a position where it can be easily installed without any concern for heat from the tail pipe.

Preferably, in the NOx reducing device, the NOx controller is provided with respect to the lower surface of the top plate, in such a manner that an air layer is formed between the NOx controller and the lower surface of the top plate.

According to this aspect, the heat protection effect can be further enhanced based on a heat insulating effect of the air layer.

This application is based on Japanese Patent application No. 2013-272367 filed in Japan Patent Office on Dec. 27, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
   an engine;
   a hydraulic pump; and
   a NOx reducing device serving as an exhaust gas aftertreatment device for treating exhaust gas from the engine to decrease NOx in the exhaust gas by using an aqueous urea solution, wherein the NOx reducing device comprises:
   a device body configured to allow execution of a urea-based selective catalytic reduction reaction for the NOx, the device body having an outlet end portion;
   a tail pipe provided at the outlet end portion;
   a NOx sensor configured to detect an amount of NOx in the exhaust gas;
   a NOx controller receiving a signal from the NOx sensor; and
   a mount table which supports the device body and which is arranged to stride over the hydraulic pump,
   the mount table comprises a top plate and a leg supporting the top plate,
   the device body and the tail pipe are provided on an upper side of the top plate,
   the top plate is interposed between the hydraulic pump and the device body in an up-and-down direction, and
   the NOx controller is provided with respect to a portion of a lower surface of the top plate in such a manner that the NOx controller is entirely covered from thereabove by the top plate, and disposed at a position away from the hydraulic pump and the device body in a direction perpendicularly intersecting the up-and-down direction.

2. The construction machine according to claim 1, wherein the top plate has a device-body support portion with an upper surface supporting the device body, and a NOx-controller installation portion with a lower surface provided with the NOx controller, and the NOx-controller installation portion is coupled to a side edge of the device-body support portion through a step portion, so as to allow an upper surface of the NOx-controller installation portion to be located below the upper surface of the device-body support portion, and allow the lower surface of the NOx-controller installation portion to be located below a lower surface of the device-body support portion.

3. The construction machine according to claim 2, wherein:

the device body is supported by the device-body support portion, in a posture where the tail pipe extends laterally from the device body;

the top plate has an end region provided at a position offset from the device body on a tail pipe side of the device body where the tail pipe is provided; and the NOx-controller installation portion is provided with respect to the end region of the top plate.

4. The construction machine according to claim 1, wherein the NOx controller is provided with respect to the lower surface of the top plate, in such a manner that an air layer is formed between the NOx controller and the lower surface of the top plate.

5. The construction machine according to claim 1, wherein the hydraulic pump and the NOx controller are disposed at a position away from the engine in the direction perpendicularly intersecting the up-and-down direction.

* * * * *